US012671596B2

(12) United States Patent
Ittogi

(10) Patent No.: US 12,671,596 B2
(45) Date of Patent: Jun. 30, 2026

(54) AUTHENTICATION APPARATUS, AUTHENTICATION TARGET APPARATUS, IMAGE FORMING APPARATUS, REPLACEMENT UNIT, AND AUTHENTICATION METHOD

(71) Applicant: Canon Kabushiki Kaisha, Tokyo (JP)

(72) Inventor: Hirotaka Ittogi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 18/528,890

(22) Filed: Dec. 5, 2023

(65) Prior Publication Data

US 2024/0205029 A1     Jun. 20, 2024

(30) Foreign Application Priority Data

Dec. 14, 2022     (JP) ................................. 2022-199550

(51) Int. Cl.
| | |
|---|---|
| *H04L 9/32* | (2006.01) |
| *G06F 21/44* | (2013.01) |
| *H04L 9/00* | (2022.01) |
| *H04L 9/08* | (2006.01) |

(52) U.S. Cl.
CPC ............ *H04L 9/3271* (2013.01); *H04L 9/002* (2013.01); *H04L 9/0838* (2013.01); *H04L 9/0861* (2013.01); *G06F 21/44* (2013.01)

(58) Field of Classification Search
CPC ..... H04L 9/3271; H04L 9/002; H04L 9/0838; H04L 9/0861; G06F 21/44
See application file for complete search history.

(56) References Cited

U.S. PATENT DOCUMENTS

| | | | |
|---|---|---|---|
| 8,281,130 | B2 | 10/2012 | Hamada |
| 9,407,439 | B2 | 8/2016 | Ittogi |
| 10,482,358 | B2 | 11/2019 | Ittogi et al. |

(Continued)

FOREIGN PATENT DOCUMENTS

| | | |
|---|---|---|
| JP | 2007173999 A | 7/2007 |
| JP | 2008048166 A | 2/2008 |
| JP | 2014033324 A | 2/2014 |

*Primary Examiner* — Robert B Leung
(74) *Attorney, Agent, or Firm* — Venable LLP

(57)     ABSTRACT

An authentication method for authenticating an authentication target apparatus by an authentication apparatus is provided. The method includes: the authentication apparatus performing first encryption processing in accordance with first encryption processing information; the authentication target apparatus performing second decryption processing in accordance with second encryption processing information; the authentication target apparatus performing second encryption processing in accordance with the second encryption processing information; the authentication apparatus performing first decryption processing in accordance with the first encryption processing information. The authentication apparatus changes the first encryption processing information in accordance with a predetermined rule when either of the first encryption processing and the first decryption processing is performed, and the authentication target apparatus changes the second encryption processing information in accordance with the predetermined rule when either of the second encryption processing and the second decryption processing is performed.

27 Claims, 12 Drawing Sheets

(56)                    References Cited

U.S. PATENT DOCUMENTS

| | | | |
|---|---|---|---|
| 11,270,172 B2 | 3/2022 | Ittogi et al. | |
| 2003/0159036 A1* | 8/2003 | Walmsley | G06Q 20/40 |
| | | | 713/168 |
| 2005/0228991 A1* | 10/2005 | Schmit | H04L 9/3271 |
| | | | 713/168 |
| 2014/0037089 A1 | 2/2014 | Itoh | |
| 2014/0304786 A1* | 10/2014 | Pei | H04L 63/0876 |
| | | | 726/6 |
| 2019/0116049 A1* | 4/2019 | Ittogi | H04L 9/3271 |
| 2020/0136817 A1* | 4/2020 | Iijima | H04L 9/0894 |
| 2021/0036873 A1* | 2/2021 | Kim | H04L 9/3278 |
| 2021/0281556 A1* | 9/2021 | Hori | G06F 21/45 |

* cited by examiner

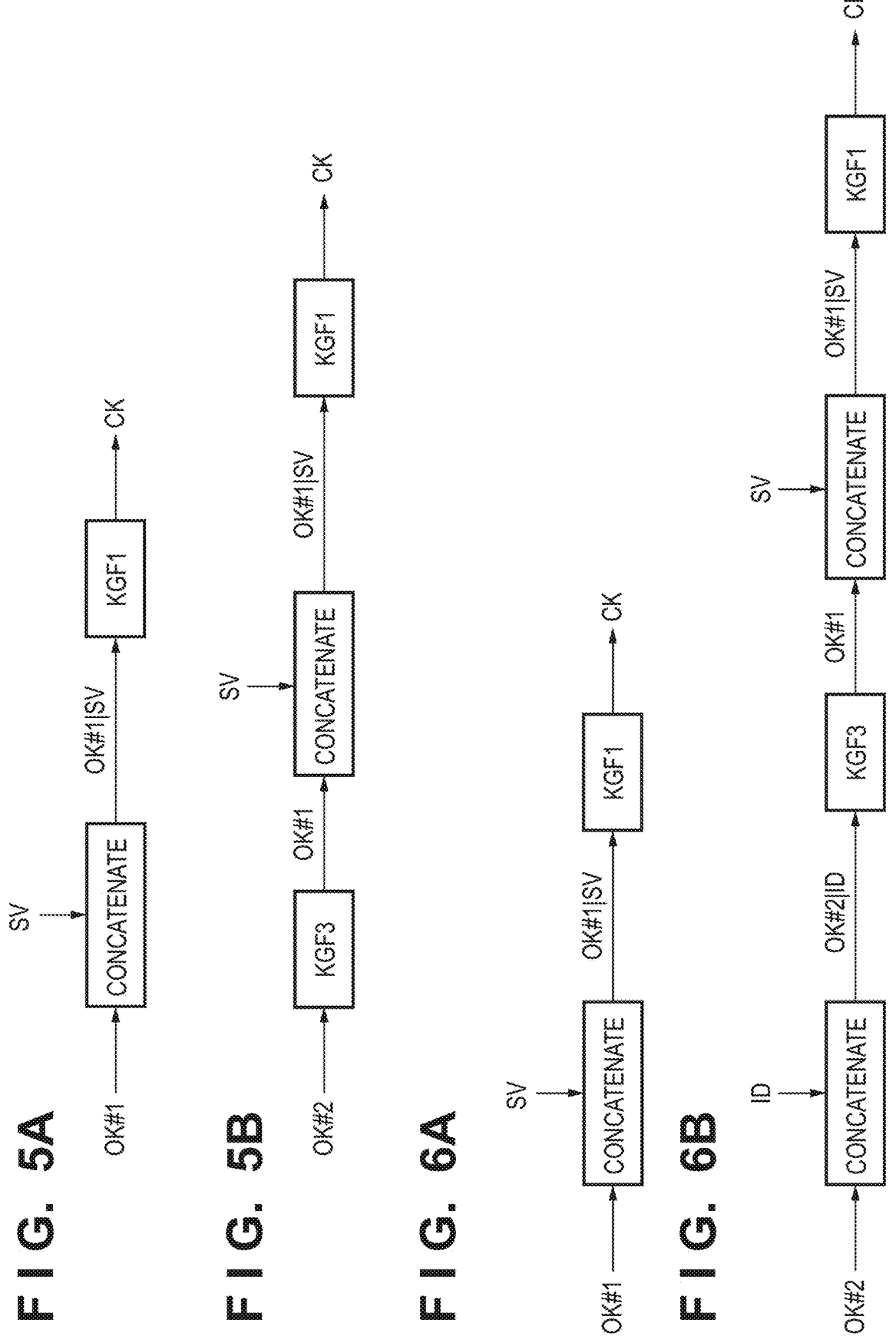
F I G. 5A
F I G. 5B
F I G. 6A
F I G. 6B

F I G. 7
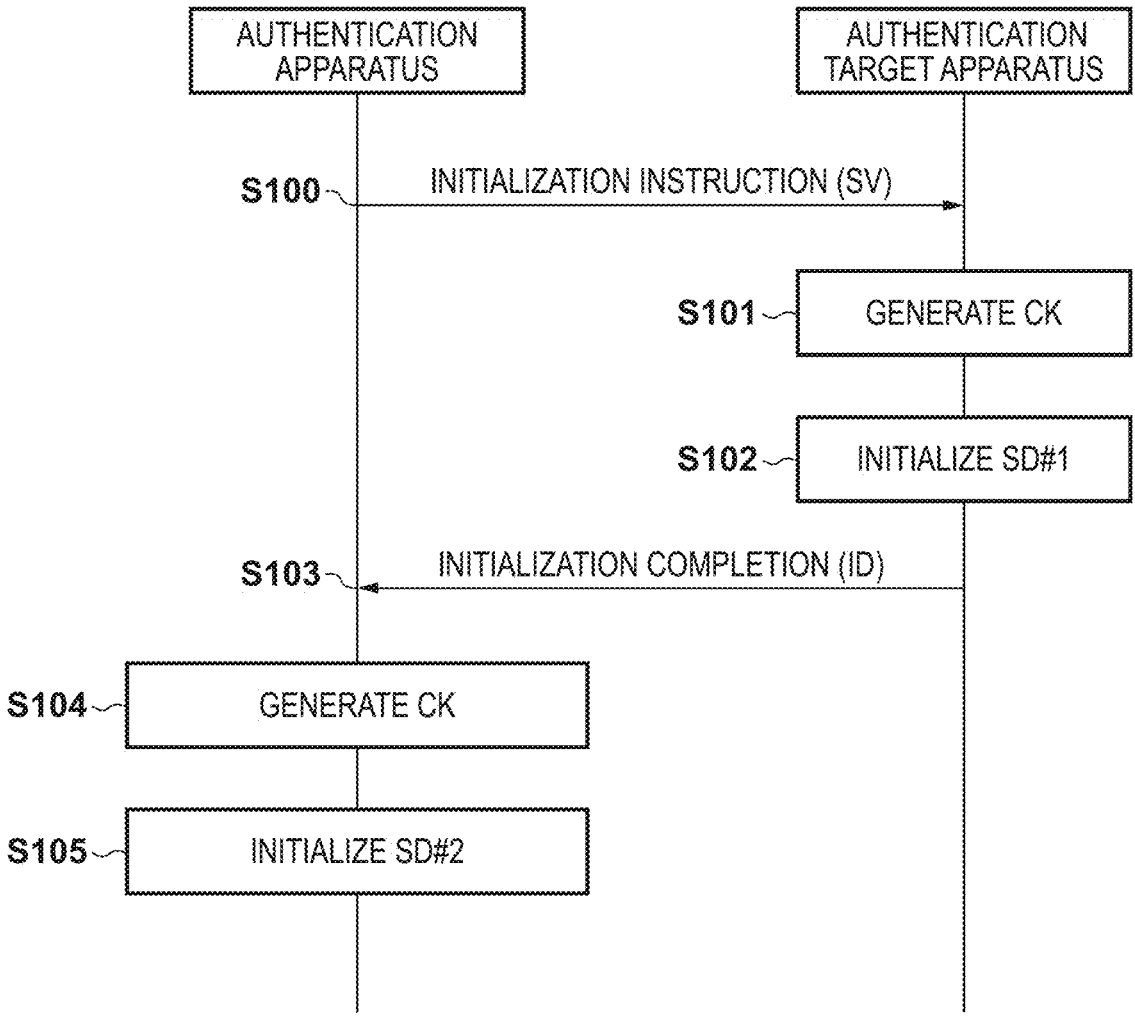

F I G. 9A
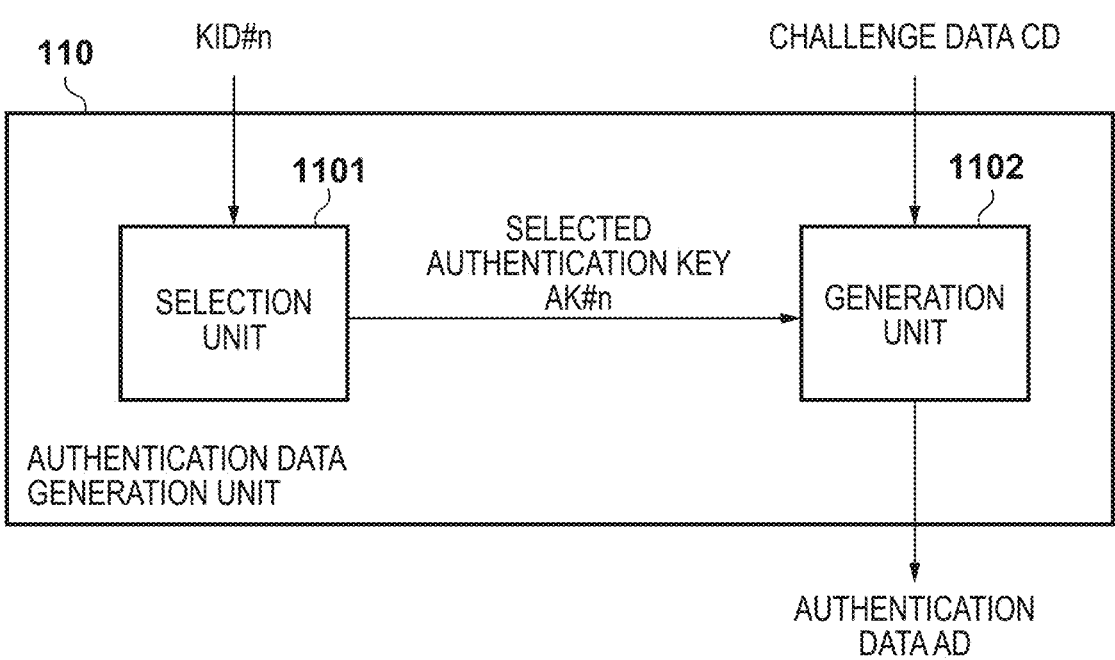
F I G. 9B
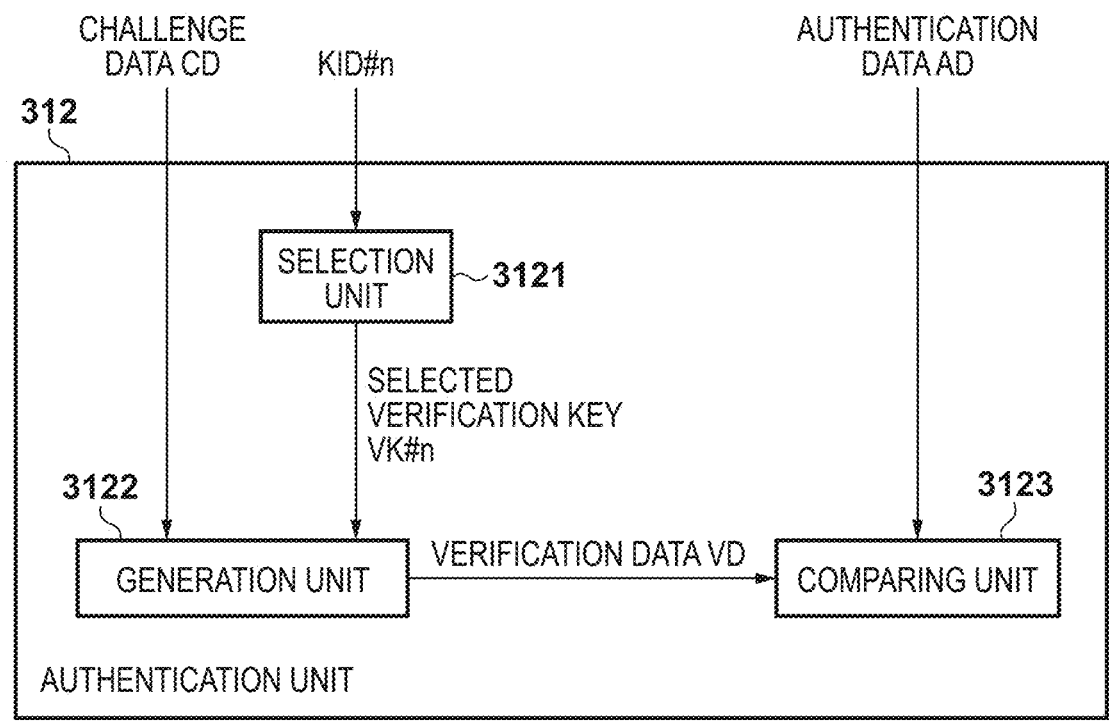

F I G.  10A
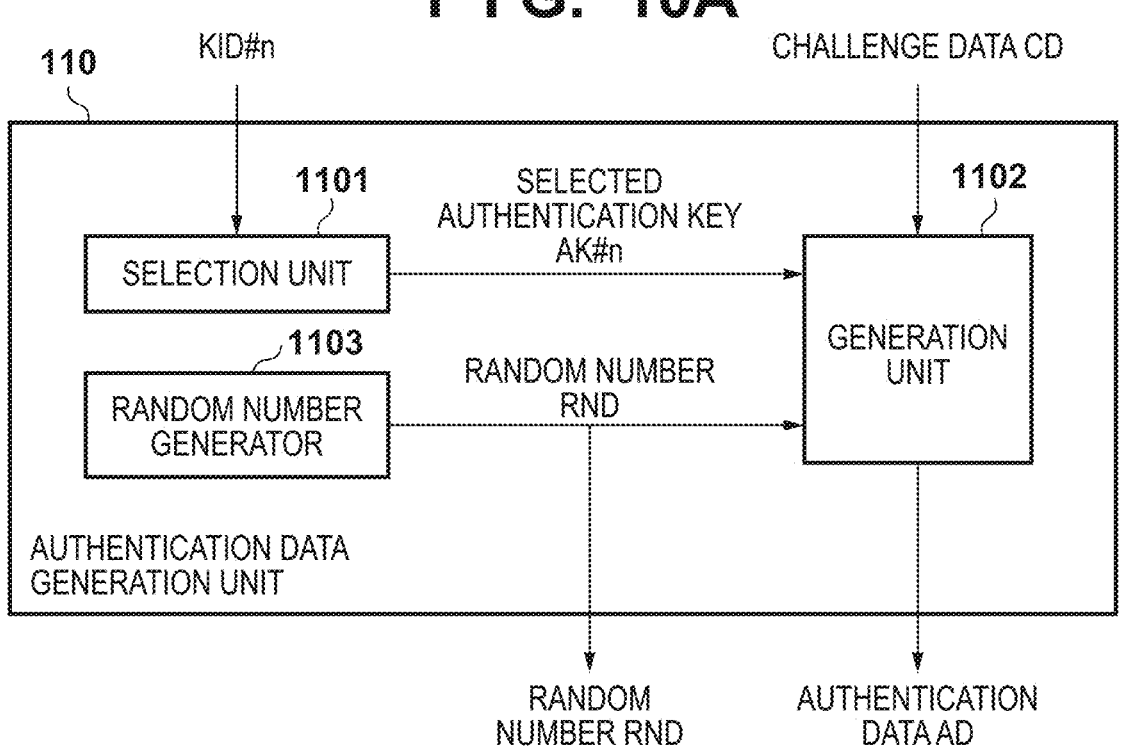
F I G.  10B
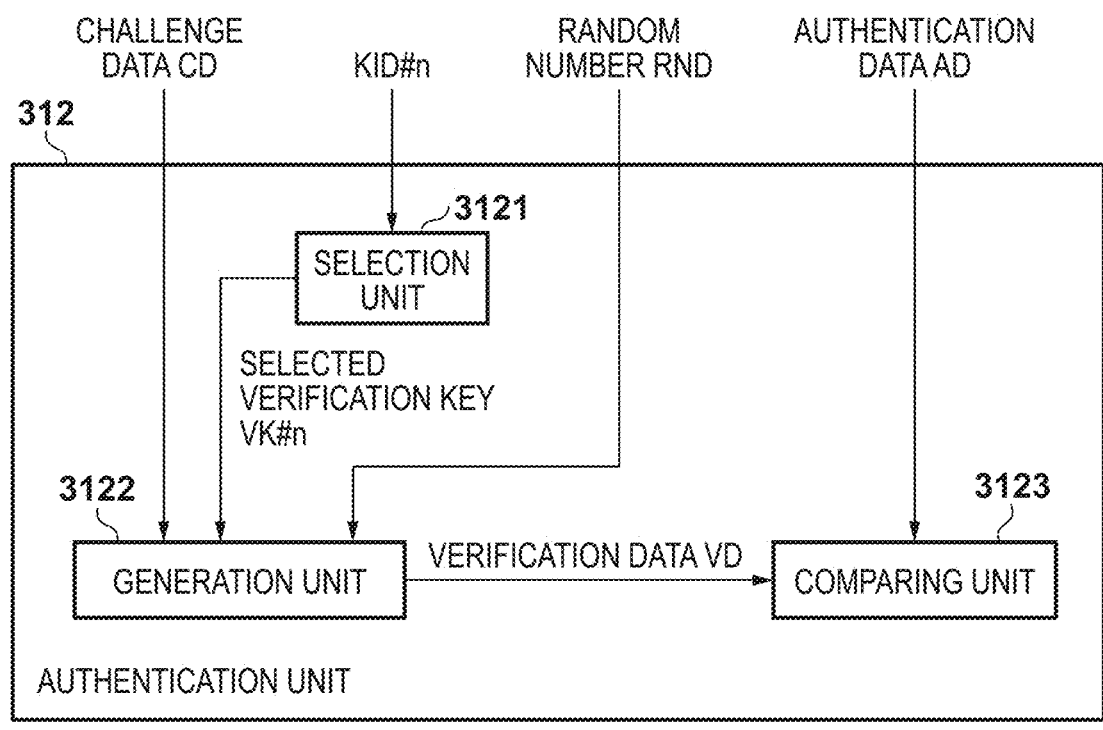

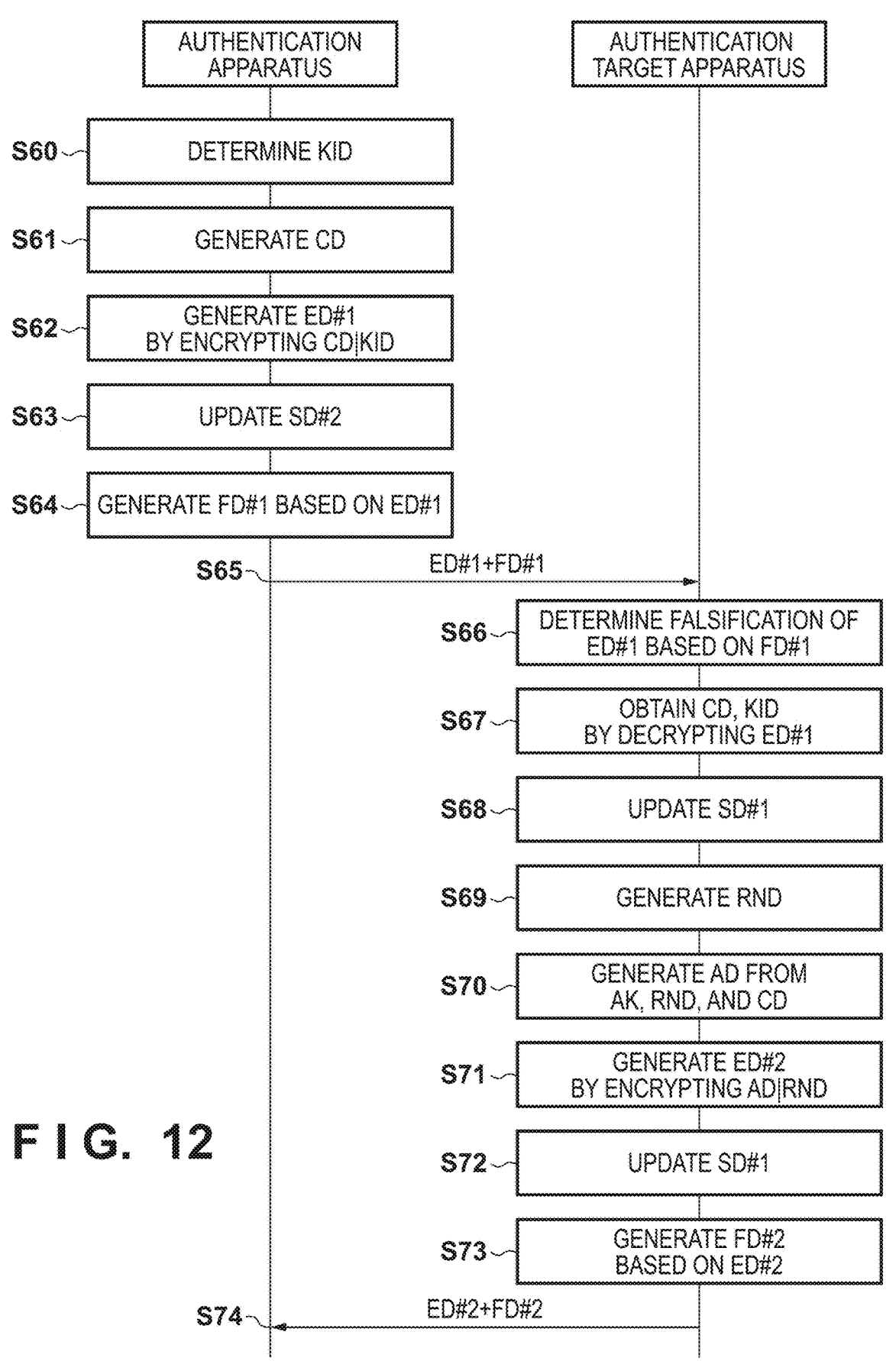
F I G. 12

F I G. 13
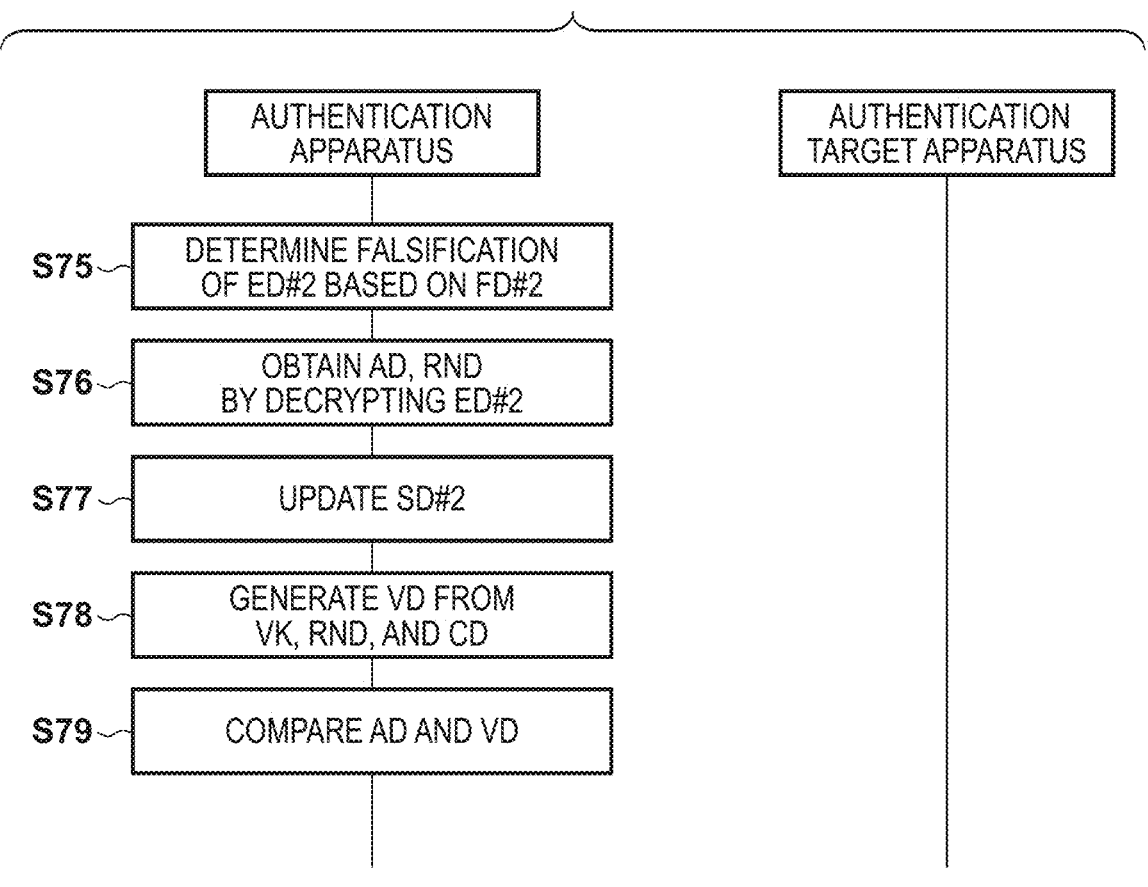

AUTHENTICATION APPARATUS, AUTHENTICATION TARGET APPARATUS, IMAGE FORMING APPARATUS, REPLACEMENT UNIT, AND AUTHENTICATION METHOD

BACKGROUND OF THE INVENTION

Field of the Invention

The present invention relates to a technique for authenticating an authentication target apparatus by an authentication apparatus.

Description of the Related Art

An image forming apparatus, for example, is configured such that it is possible to replace a unit having a shorter life span than a main body of the image forming apparatus or a unit including a consumable such as toner. In the following description, a unit of an apparatus configured to be replaceable will be referred to as a replacement unit of the apparatus. If a non-genuine replacement unit is attached to the main body of the apparatus and used, the apparatus may not operate correctly or the main body of the apparatus may be damaged. Therefore, it is necessary to determine whether a replacement unit of the apparatus is a genuine product, and when it is determined that the replacement unit is not a genuine product, notify the user of the apparatus that the replacement unit is not a genuine product to warn the user.

In order to determine whether the replacement unit is a genuine product, the main body of the apparatus is made to be an authentication apparatus, and the replacement unit is authenticated as an authentication target apparatus. For authentication, for example, a challenge-response scheme may be used. In the challenge-response scheme, the secrecy of secret information used for authentication is important, and therefore a tamper-resistant device is used. A tamper-resistant device stores secret information and performs processing related to authentication using the secret information. US-2014-0037089 discloses a configuration that increases resistance to probing.

However, US-2014-0037089 does not disclose measures against side channel attacks. For example, in a challenge-response scheme, the authentication target apparatus obtains response data that is output of an authentication function by using challenge data received from the authentication apparatus and the secret information held by the authentication target apparatus as an input of the authentication function. Then, the authentication target apparatus transmits the response data to the authentication apparatus. If the attacker can control the challenge data, which is one of the inputs of the authentication function, and observe the response data from the outside, the secret information can be inferred by the side channel attack.

SUMMARY OF THE INVENTION

According to an aspect of the present disclosure, an authentication method for authenticating an authentication target apparatus storing one or more pieces of authentication information by an authentication apparatus storing one or more pieces of verification information is provided. The one or more pieces of authentication information respectively corresponding to the one or more pieces of verification information. The method includes: the authentication apparatus generating verification data by using selected verification information from among the one or more pieces of verification information and challenge data; the authentication apparatus generating second data by performing first encryption processing on first data including the challenge data in accordance with first encryption processing information, and transmitting the second data to the authentication target apparatus; the authentication target apparatus generating third data by performing second decryption processing on the second data in accordance with second encryption processing information; the authentication target apparatus generating authentication data by using selected authentication information corresponding to the selected verification information from among the one or more pieces of authentication information and the challenge data included in the third data; the authentication target apparatus generating fifth data by performing second encryption processing on fourth data including the authentication data in accordance with the second encryption processing information, and transmitting the fifth data to the authentication apparatus; the authentication apparatus generating sixth data by performing first decryption processing on the fifth data in accordance with the first encryption processing information; and the authentication apparatus authenticating the authentication target apparatus by comparing the authentication data included in the sixth data and the verification data. The authentication apparatus changes the first encryption processing information in accordance with a predetermined rule when either of the first encryption processing and the first decryption processing is performed, and the authentication target apparatus changes the second encryption processing information in accordance with the predetermined rule when either of the second encryption processing and the second decryption processing is performed.

Further features of the present invention will become apparent from the following description of exemplary embodiments with reference to the attached drawings.

BRIEF DESCRIPTION OF THE DRAWINGS

FIG. 5A and FIG. 5B are illustrations of a process for generating a communication key according to some embodiments.

FIG. 6A and FIG. 6B are illustrations of a process for generating a communication key according to some embodiments.

FIG. 7 is a sequence diagram of initialization processing according to some embodiments.

FIG. 9A is a block diagram of an authentication data generation unit according to some embodiments.

FIG. 9B is a block diagram of an authentication unit according to some embodiments.

FIG. 10A is a block diagram of an authentication data generation unit according to some embodiments.

FIG. 10B is a block diagram of an authentication unit according to some embodiments.

FIG. 12 is a sequence diagram of authentication processing according to some embodiments.

FIG. 13 is a sequence diagram of authentication processing according to some embodiments.

DESCRIPTION OF THE EMBODIMENTS

Figure 1:
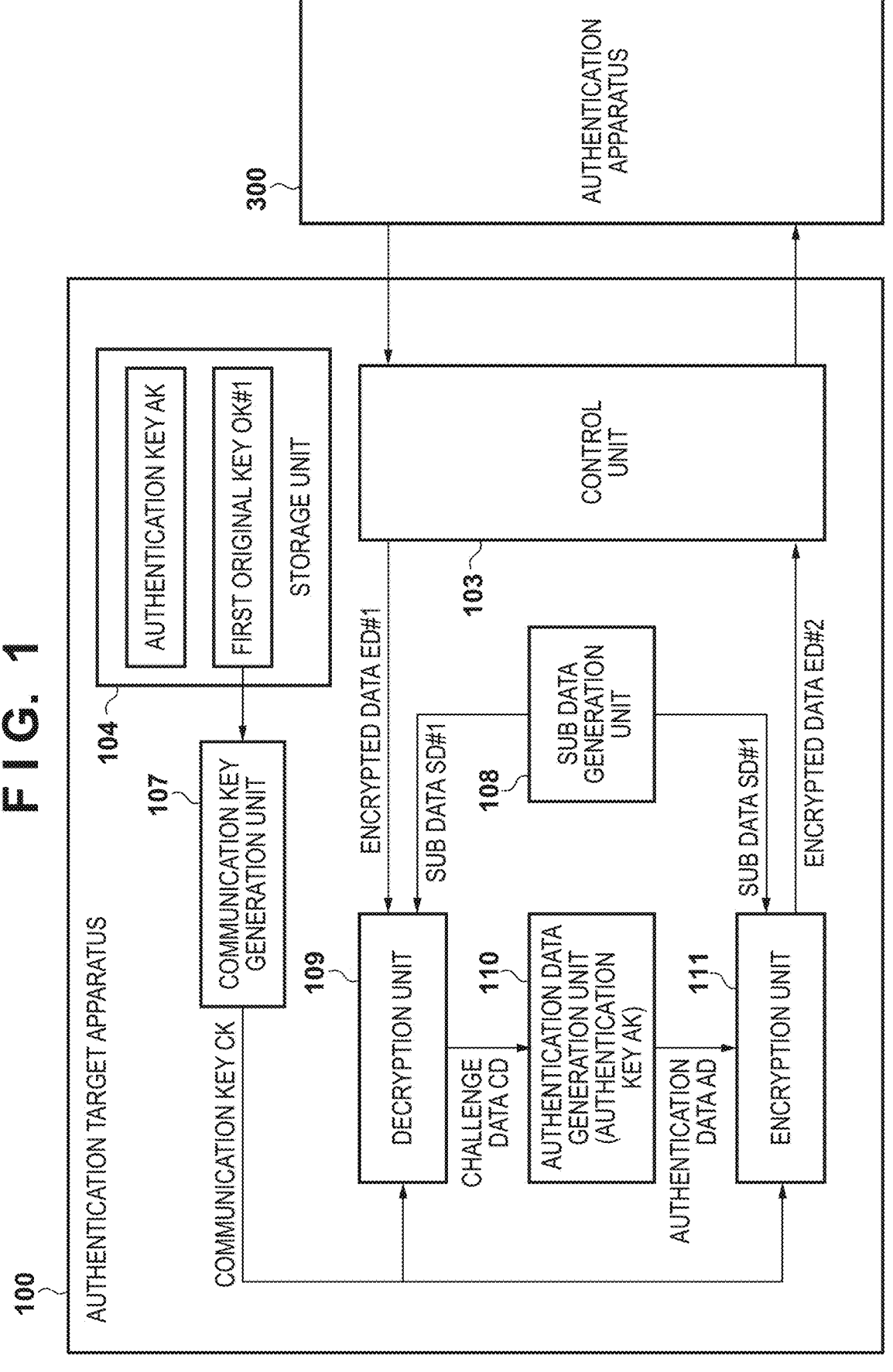
FIG. 1 is a block diagram of an authentication target apparatus according to some embodiments.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

Figure 2:
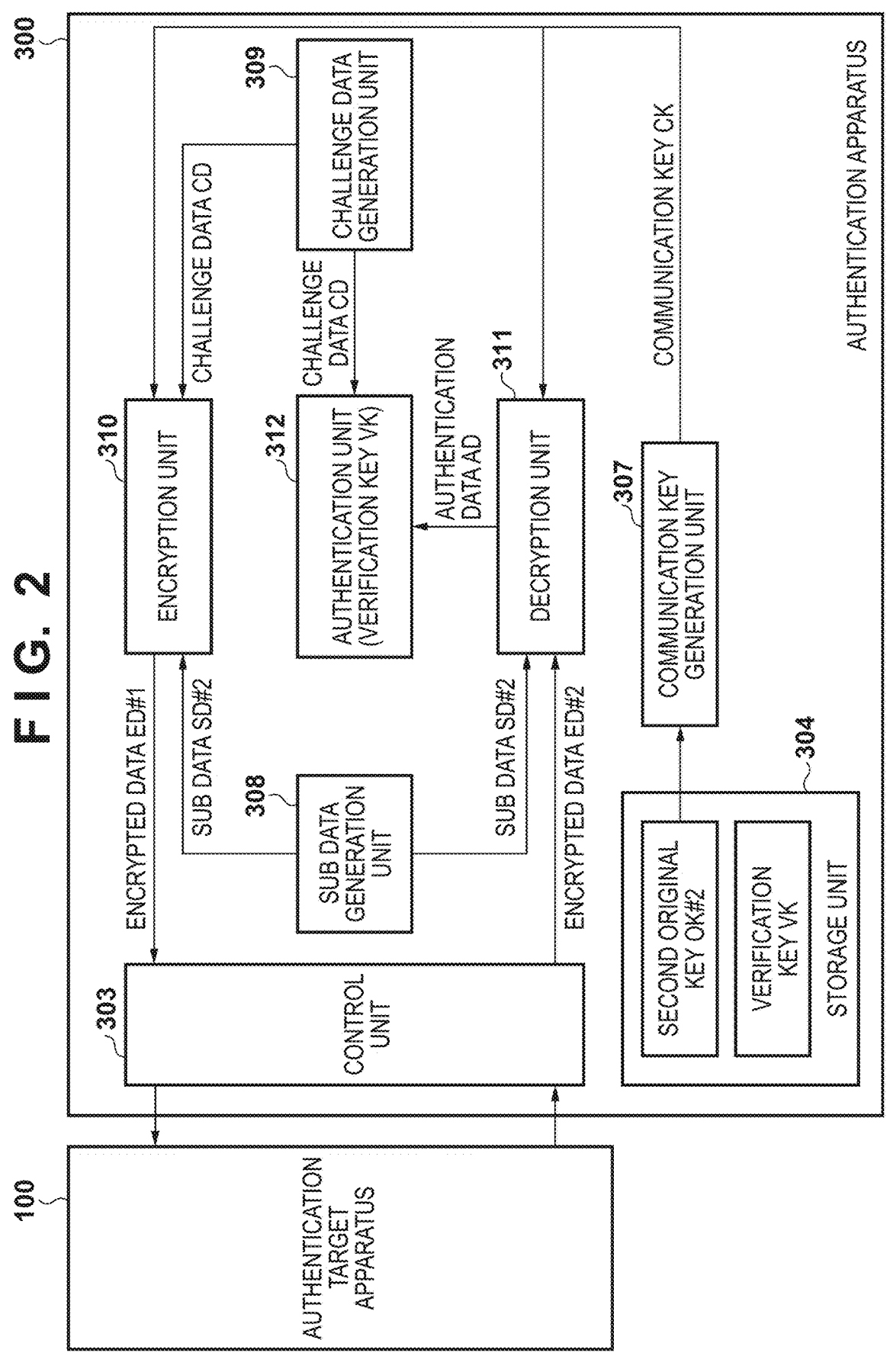
FIG. 2 is a block diagram of an authentication apparatus according to some embodiments.

FIG. 1 is a configuration diagram of an authentication target apparatus 100 according to the present embodiment, and FIG. 2 is a configuration diagram of an authentication apparatus 300 according to the present embodiment. The authentication target apparatus 100 is an apparatus to be authenticated by the authentication apparatus 300. The authentication apparatus 300 may be provided in a main body portion of a predetermined apparatus that is used by mounting a replacement unit therein, and the authentication target apparatus 100 may be provided in the replacement unit. For example, the authentication apparatus 300 is provided in the main body of the image forming apparatus. In this case, the authentication target apparatus 100 is provided in the replacement unit of the image forming apparatus. The replacement unit of the image forming apparatus may be, for example, a process cartridge including one or more of a photoreceptor, a charger, and a developing apparatus. The predetermined apparatus is configured so that when the replacement unit is attached to the main body of the predetermined apparatus, the authentication apparatus 300 of the main body and the authentication target apparatus 100 of the replacement unit can communicate with each other. Then, for example, when a predetermined condition is satisfied or when an instruction is given from the user, the authentication apparatus 300 of the main unit authenticates the authentication target apparatus 100 of the replacement unit. When the authentication of the authentication target apparatus 100 is successful, the main body unit determines that the replacement unit is a genuine product, and when the authentication is unsuccessful, the main body unit determines that the replacement unit is not a genuine product.

First, information stored in the authentication target apparatus 100 and the authentication apparatus 300 in advance will be described. A storage unit 104 of the authentication target apparatus 100 stores an authentication key AK and a first original key OK #1, and a storage unit 304 of the authentication apparatus 300 stores a verification key VK and a second original key OK #2. The authentication key AK is authentication information used to generate authentication data (response data) based on the challenge data. The verification key VK is verification information used to generate verification data based on the challenge data. In the following explanation, the authentication key AK and the verification key VK are assumed to be the same data.

In the present embodiment, the authentication apparatus 300 encrypts the challenge data and transmits the challenge data to the authentication target apparatus 100, and the authentication target apparatus 100 encrypts authentication data generated based on the challenge data and the authentication key AK and transmits the encrypted data to the authentication apparatus 300. That is, the authentication apparatus 300 and the authentication target apparatus 100 are configured to perform encrypted communication. The first original key OK #1 and the second original key OK #2 are data that are sources for generating a communication key for encrypting and decrypting various types of data transmitted and received between the authentication apparatus 300 and the authentication target apparatus 100. As will be described later, the first original key OK #1 and the second original key OK #2 may be the same data or may be different data.

Processing performed by each functional block in the authentication target apparatus 100 illustrated in FIG. 1 and the authentication apparatus 300 illustrated in FIG. 2 will be described below with reference to the sequences illustrated in FIG. 3 and FIG. 4. Note that a control unit 103 in FIG. 1 controls the entire authentication target apparatus 100, and a control unit 303 in FIG. 2 controls the entire authentication apparatus 300. However, for the sake of simplification of the drawings, control lines connecting the control unit 103 and other functional blocks and control lines connecting the control unit 303 and other functional blocks are omitted from the drawings. An authentication data generation unit 110 of the authentication target apparatus 100 is configured to be able to access the storage unit 104 and obtain the authentication key AK. Similarly, an authentication unit 312 of the authentication apparatus 300 is configured to be able to access the storage unit 304 and obtain the verification key VK.

Figure 3:
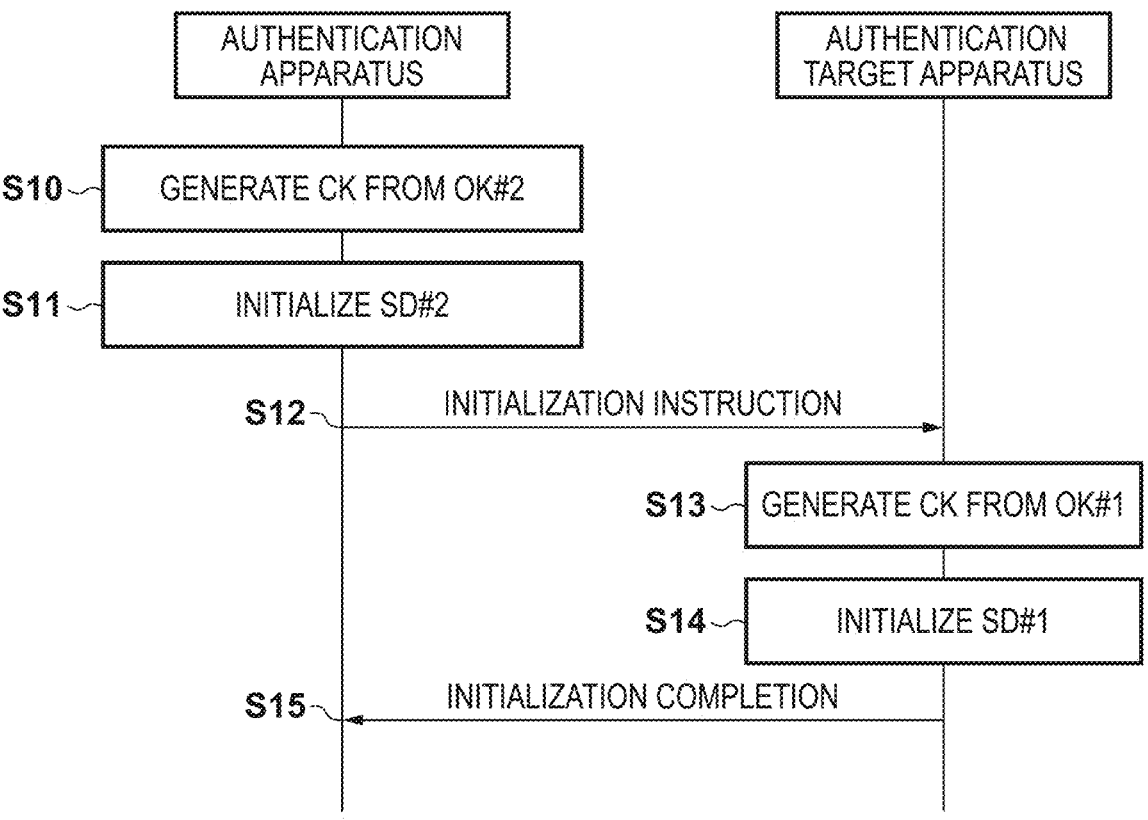
FIG. 3 is a sequence diagram of initialization processing according to some embodiments.

FIG. 3 is a sequence diagram of an initialization processing that is started in a case where a replacement unit including the authentication target apparatus 100 is mounted in a main body portion of a predetermined apparatus that the authentication apparatus 300 is provided in. In step S10, a communication key generation unit 307 of the authentication apparatus 300 generates a communication key CK based on the second original key OK #2. The communication key CK may be generated using a key generation function KGF2. That is, CK=KGF2 (OK #2). Subsequently, in step S11, a sub data generation unit 308 of the authentication apparatus 300 initializes a value of sub data SD #2, that is, sets the value to the initial value. In the present embodiment, the initial value is set to 0 as an example. In step S12, the control unit 303 of the authentication apparatus 300 transmits an initialization command instructing the control unit 103 of the authentication target apparatus 100 to execute initialization.

In response to the initialization command, a communication key generation unit 107 of the authentication target apparatus 100 generates the communication key CK based on the first original key OK #1. The communication key CK may be generated using a key generation function KGF1. That is, CK=KGF1 (OK #1). In the present embodiment, the communication key CK generated by the authentication apparatus 300 in step S10 and the communication key CK generated by the authentication target apparatus 100 in step S13 are the same. For this reason, the first original key OK #1 is generated by inputting the second original key OK #2 into a key generation function KGF3. That is, OK #1=KGF3

(OK #2). Here, the key generation function KGF2 is set to be KGF1 (KGF3) based on the key generation function KGF1 and KGF3. For example, when the key generation function KGF3 is a function that outputs the input as it is, the first original key OK #1 and the second original key OK #2 are the same data, and the key generation function KGF1 and the key generation function KGF2 are the same function. Otherwise, the first original key OK #1 and the second original key OK #2 are different data.

A one-way function is used for the key generation functions KGF1 and KGF2. That is, a function for which it is easy to calculate the output value based on the input value, but difficult to do the inverse is used. As an example, a cryptographic hash function standardized in NIST FIPS PUB 180-4 can be used as the key generation functions KGF1 and KGF2.

In step S14 of FIG. 3, a sub data generation unit 108 of the authentication target apparatus 100 initializes a value of sub data SD #1, that is, sets the value to an initial value. The initial value is the same as the initial value of the sub data SD #2 in step S11, and is 0 in the present example. Thereafter, the control unit 103 of the authentication target apparatus 100 notifies the control unit 303 of the authentication apparatus 300 of the completion of the initialization in step S15.

Through the initialization processing illustrated in FIG. 3, the authentication apparatus 300 and the authentication target apparatus 100 generate the same communication key CK, and set the same initial values in the sub data SD #1 and SD #2. Note that the order of the sequence illustrated in FIG. 3 is only an example, and the present embodiment is not limited to the order illustrated in FIG. 3. That is, the authentication target apparatus 100, in response to the initialization command from the authentication apparatus 300, may generate the communication key CK and initialize the sub data SD #1 in a discretionary order, and notify the authentication apparatus 300 of the completion of the initialization when these operations are completed. Also, the authentication apparatus 300 can transmit an initialization command to the authentication target apparatus 100 by starting the initialization processing, and thereafter, can generate the communication key CK and initialize the sub data SD #2 in a discretionary order.

Figure 4:
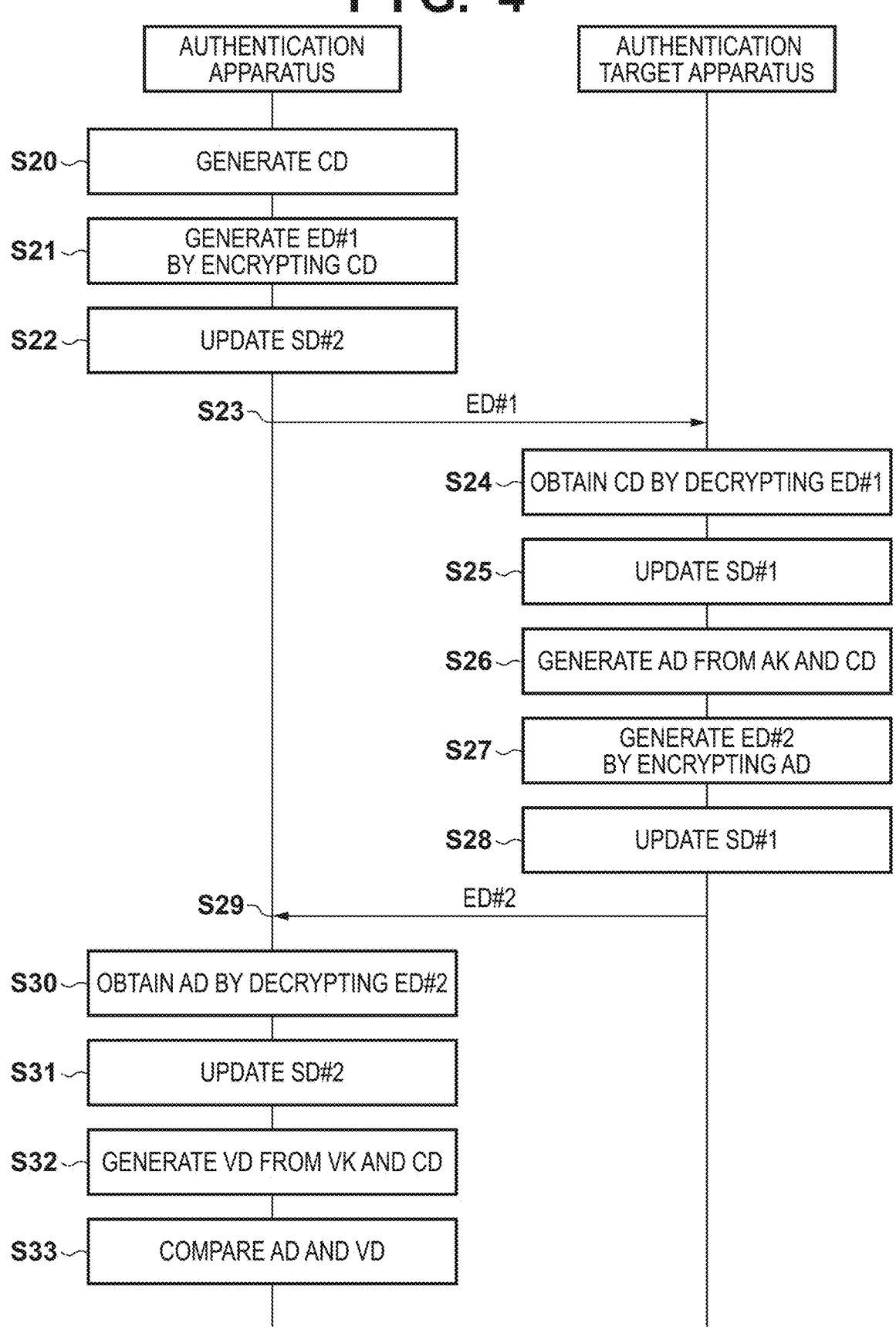
FIG. 4 is a sequence diagram of authentication processing according to some embodiments.

FIG. 4 is a sequence diagram of an authentication process. The authentication process may be automatically started, for example, upon completion of the initialization processing of FIG. 3. Further, the authentication process may be started in response to a user of the predetermined apparatus which includes the authentication apparatus 300 inputting an instruction into the predetermined apparatus to execute the authentication process. In the following description, the authentication process of FIG. 4 is performed after the initialization processing of FIG. 3 as an example. Therefore, the values of the sub data SD #1 and SD #2 at the starting point of the authenticating process in FIG. 4 are the same initial value, that is, 0 in the present example. In step S20, a challenge data generation unit 309 of the authentication apparatus 300 generates the challenge data CD and outputs it to an encryption unit 310. The method of generating the challenge data CD is discretionary. In step S21, the encryption unit 310 of the authentication apparatus 300 performs encryption of the challenge data CD based on the communication key CK and the sub data SD #2 from the sub data generation unit 308 to generate encrypted data ED #1. Note that the value of the sub data SD #2 at this point is 0.

Encryption of the challenge data CD can be performed, for example, by using a CBC, CFB, CTR, OFB mode or the like as standardized in NIST SP 800-38A. The sub data SD #2 is used as an initial vector IV in the encryption processing. A different initial vector IV will result in a different value of the encrypted data ED #1 even if the same challenge data CD is encrypted using the same communication key CK. Therefore, the communication key CK and the sub data SD #2 can be regarded as constituting one encryption key for communication for controlling the encryption processing or constituting encryption processing information for communication.

After generating the encrypted data ED #1, the sub data generation unit 308 of the authentication apparatus 300 updates the value of the sub data SD #2 in step S22. The method of updating the value of the sub data SD #2 is discretionary as long as it matches the method of updating the value of the sub data SD #1 in the authentication target apparatus 100. Here, for the sake of simplicity of explanation, it is assumed that the values of the sub data SD #2 and the sub data SD #1 are incremented by one each time updating is performed. Therefore, in the present example, in step S22, the sub data generation unit 308 updates the value of the sub data SD #2 to 1.

Thereafter, in step S23, the control unit 303 of the authentication apparatus 300 transmits the encrypted data ED #1 to the control unit 103 of the authentication target apparatus 100. It should be noted that an error detecting code may be added to the encrypted data ED #1 and transmitted to the control unit 103 of the authentication target apparatus 100. In this case, for example, when an error is detected, the control unit 103 of the authentication target apparatus 100 can request that the control unit 303 of the authentication apparatus 300 retransmit the data.

Upon receiving the encrypted data ED #1 from the control unit 103, a decryption unit 109 of the authentication target apparatus 100 decrypts the encrypted data ED #1 based on the communication key CK and the sub data SD #1 in step S24, and acquires the challenge data CD. Note that the value of the sub data SD #1 at this point in time is 0, which is the same as the value of the sub data SD #2 at the time of encryption in step S21. Furthermore, the communication key CK of the authentication apparatus 300 and the authentication target apparatus 100 are the same. Therefore, the encryption processing information used in the step S21 encryption processing (the combination of SD #2 and CK) and the encryption processing information used in step S24 decryption processing (the combination of SD #1 and CK) are the same. Therefore, the decryption unit 109 can decrypt the encrypted data ED #1 to obtain the challenge data CD. After decrypting the encrypted data ED #1, the sub data generation unit 108 of the authentication target apparatus 100 updates, in step S25, the value of the sub data SD #1 to 1.

In step S26, the authentication data generation unit 110 generates the authentication data AD that is the response data, using the authentication function, based on the challenge data CD from the decryption unit 109 and the authentication key AK. For example, the authentication data generation unit 110 may use a cryptographic hash function as the authentication function. Here, the authentication data generation unit 110 sets a hash value of concatenated data of the challenge data CD and the authentication key AK as the input of the authentication function, and sets the output as the authentication data AD. In step S27, an encryption unit 111 of the authentication target apparatus 100 performs encryption of the authentication data AD based on the communication key CK and the sub data SD #1 from the sub data generation unit 308 to generate encrypted data ED #2.

Note that the value of the sub data SD #1 at this point is 1. The encryption processing in the encryption unit 111 is similar to the processing in the encryption unit 310 of the authentication apparatus 300. After generating the encrypted data ED #2, in step S28, the sub data generation unit 108 of the authentication target apparatus 100 updates the value of the sub data SD #1 to 2. Thereafter, in step S29, the control unit 303 of the authentication apparatus 300 transmits the encrypted data ED #2 to the control unit 103 of the authentication target apparatus 100. The encrypted data ED #2 may also be configured to be protected by an error-detecting code.

Upon receiving the encrypted data ED #2 from the control unit 303, a decryption unit 311 of the authentication apparatus 300 decrypts the encrypted data ED #2 based on the communication key CK and the sub data SD #2 in step S30, and acquires the authentication data AD. Note that the value of the sub data SD #1 at this point in time is 1, which is the same as the value of the sub data SD #2 at the time of encryption in step S27. Therefore, the decryption unit 311 can decrypt the encrypted data ED #2. After decrypting the encrypted data ED #2, in step S31, the sub data generation unit 308 of the authentication apparatus 300 updates the value of the sub data SD #2 to 2.

In step S32, the authentication unit 312 of the authentication apparatus 300 generates verification data VD based on the challenge data CD from the challenge data generation unit 309 and the verification key VK. The method of generating the verification data VD is the same as the method of generating the authentication data AD in the authentication data generation unit 110. In step S33, the authentication unit 312 authenticates the authentication target apparatus 100 by comparing the verification data VD with the authentication data AD from the decryption unit 311. Specifically, in the present embodiment, the functions used to generate the authentication data AD and the verification data VD are the same, and in a case where the authentication target apparatus 100 is a genuine product, the authentication key AK and the verification key VK will be the same. Therefore, when the authentication target apparatus 100 is a genuine product, the authentication data AD and the verification data VD coincide with each other. Therefore, when the verification data VD and the authentication data AD coincide with each other, the authentication unit 312 determines that authentication is successful, and otherwise determines that authentication is unsuccessful. The authentication unit 312 notifies the control unit 303 of the authentication result. When the authentication is successful, the control unit 303 determines that the replacement unit that comprises the authentication target apparatus 100 is a genuine product, and when the authentication is unsuccessful, determines that the replacement unit is not a genuine product. In a case where it is determined that the replacement unit is not a genuine product, the control unit 303 executes a predetermined process of, for example, notifying the user of that fact.

When the authentication process is started again after that, the values of the sub data SD #1 and SD #2 at the starting point of the authentication process are values at the end of the previous authentication process. For example, in the above-described example, the value of both the sub data SD #1 and SD #2 at the point in time when the authenticating process executed after the initialization processing is completed is 2. Therefore, when the authentication process is started next without performing the initialization processing, the value of both the sub data SD #1 and SD #2 at the time of encryption in step S21 and decryption in step S24 of FIG. 4 is 2.

As is clear from the explanation in FIG. 3 and FIG. 4, the sub data SD #1 and SD #2 may be updated in the same way, and the invention is not limited to an increase by one each time. Also, the initial value of the sub data SD #1 and SD #2 need not be 0. That is, the sub data generation unit 108 of the authentication target apparatus 100 and the sub data generation unit 308 of the authentication apparatus 300 have the same initial value, and the values of the sub data SD #1 and SD #2 may be updated according to the same predetermined rule. Since the encryption processing information used by the two apparatuses in the encrypted communication is the same, the authentication apparatus 300 and the authentication target apparatus 100 are configured such that, when the encryption processing and the decryption processing are performed, the next encryption processing and the decryption processing are not performed until the sub data is updated.

Also, the order of the authentication process of FIG. 4 is only an example, and the present embodiment is not limited to the order illustrated in FIG. 4. For example, the generation (step S32) of the verification data VD in the authentication apparatus may be performed at a discretionary time from when the challenge data CD is generated in step S20 until when the verification data VD and the authentication data AD are compared in step S33.

As described above, the challenge data CD and the authentication data AD transmitted and received between the authentication apparatus 300 and the authentication target apparatus 100 are encrypted. Further, the values of the sub data SD #1 and SD #2 are updated in accordance with a predetermined update rule each time encryption or decryption is performed. That is, the encryption processing information composed of the communication key CK and the sub data SD is changed every time the challenge data CD and the authentication data AD are transmitted and received between the authentication apparatus 300 and the authentication target apparatus 100. With this configuration, even if the challenge data CD and the authentication data AD to be encrypted are the same, the data input and output to and from the authentication apparatus 300 and the authentication target apparatus 100 differs for each communication.

As described above, since the authentication apparatus 300 and the authentication target apparatus 100 perform encrypted communication, an attacker cannot observe the challenge data CD and the authentication data AD transmitted and received between the authentication apparatus 300 and the authentication target apparatus 100. Further, since the encryption processing information for the encrypted communication is made to be different for each communication, it is difficult for the attacker to control the challenge data CD to be inputted to the authentication data generation unit 110. Therefore, with the above-described configuration, resistance to side channel attack becomes higher, and it is possible to make it difficult to infer secret information such as an authentication key and a verification key.

In the present embodiment, the initialization processing is started when a replacement unit including the authentication target apparatus 100 is mounted in the main body of a predetermined apparatus provided with the authentication apparatus 300. However, the initialization processing may be started when a predetermined condition including a discretionary other condition is satisfied. For example, the initialization processing may be started in response to a user of the predetermined apparatus which includes the authentication apparatus 300 inputting an instruction into the predetermined apparatus to execute the initialization processing.

Further, in the present embodiment, the authentication target apparatus 100 generates the communication key CK based on the first original key OK #1, and the authentication apparatus 300 generates the communication key CK based on the second original key OK #2. However, the communication key CK may be stored in each of the storage unit 104 of the authentication target apparatus and the storage unit 304 of the authentication apparatus 300. In this case, in the initialization processing, only the sub data SD #1 and SD #2 are changed to the initial values. Furthermore, the communication key generation unit 107 may be configured to generate the communication key CK when the communication key CK is used in the encryption processing or the decryption processing, instead of generating the communication key CK in the initialization processing. It is similar for the communication key generation unit 307.

Second Embodiment

Next, a second embodiment will be described with a focus on differences from the first embodiment. In the first embodiment, the communication key CK generated in the initialization processing is the same at all times. In the present embodiment, the communication key CK is also changed.

FIG. 5A is an explanatory diagram of a process of generating a communication key CK performed by the communication key generation unit 107 of the authentication target apparatus 100, and FIG. 5B is an explanatory diagram of a process of generating a communication key CK performed by the communication key generation unit 307 of the authentication apparatus 300. The communication key generation unit 107 generates concatenated data by concatenating the first original key OK #1 and a session value SV, and generates the communication key CK by setting the concatenated data as the input of the key generation function KGF1. In the following description, concatenated data concatenating data X and data Y is expressed as "X|Y". Also, the session value SV will be described later.

The communication key generation unit 307 of the authentication apparatus 300 first converts the second original key OK #2 into the first original key OK #1 by inputting the second original key OK #2 into the key generation function KGF3. After that, the communication key generation unit 107 similarly generates concatenated data by concatenating the first original key OK #1 and the session value SV, and generates the communication key CK by setting the concatenated data as the input of the key generation function KGF1. When the session value SV used by the communication key generation unit 107 and the session value SV used by the communication key generation unit 307 are the same data, the communication key CK generated by the communication key generation unit 107 and the communication key CK generated by the communication key generation unit 307 will be the same.

The key generation function KGF2 described in the first embodiment corresponds to the part from the key generation function KGF3 to the key generation function KGF1 in FIG. 5B. In the configuration of the first embodiment, the first original key OK #1 is inputted to the key generation function KGF1 without generating concatenated data that concatenates it with the session value SV as in FIG. 5A and FIG. 5B.

In the present embodiment, in the initialization processing of FIG. 3, the control unit 303 of the authentication apparatus 300 generates the session value SV in a discretionary manner, for example, randomly. Then, in step S10, the communication key generation unit 307 generates the communication key CK based on the second original key OK #2 and the session value SV. In addition, the control unit 303 of the authentication apparatus 300 notifies the authentication target apparatus 100 of the session value SV in step S12. Then, in step S13, the communication key generation unit 107 of the authentication target apparatus 100 generates the same communication key CK generated by the authentication apparatus 300 based on the first original key OK #1 and the session value SV.

If the session value SV generated at the time of the initialization processing differs from the session value SV generated at the time of the previous initialization processing, the communication key CK generated in the initialization processing will differ from the communication key CK generated in the previous initialization processing. Note that the present embodiment is not limited to a configuration in which the session value SV is randomly generated, and, for example, a configuration in which the session value SV is generated according to an order of predetermined values can be adopted.

FIG. 6 illustrates another exemplary method of generating a communication key CK according to the present embodiment. FIG. 6A is an explanatory diagram of a process of generating a communication key CK performed by the communication key generation unit 107 of the authentication target apparatus 100, and is the same as that in FIG. 5A. In the present example, it is assumed that the first original key OK #1 is generated by setting concatenated data obtained by concatenating the second original key OK #2 and an identifier ID unique to the authentication target apparatus 100 as the input to the key generation function KGF3.

FIG. 6B is an explanatory diagram of a process of generating the communication key CK performed by the communication key generation unit 307 of the authentication apparatus 300. The communication key generation unit 307 generates the first original key OK #1 by setting concatenated data obtained by concatenating the second original key OK #2 and the identifier ID of the authentication target apparatus 100 as the input of the key generation function KGF3. Then, as in FIG. 5B, the communication key CK is generated by setting the concatenated data of the first original key OK #1 and the session value SV as the input of the key generation function KGF1.

FIG. 7 is a sequence diagram of initialization processing when the identifier ID of the authentication target apparatus 100 is used to generate the communication key CK. In step S100, the control unit 303 of the authentication apparatus 300 transmits an initialization command to the control unit 103 of the authentication target apparatus 100. At this time, the control unit 303 notifies the control unit 103 of the session value SV. In step S101, the communication key generation unit 107 of the authentication target apparatus 100 generates a communication key CK based on the first original key OK #1 and the session value SV notified by the authentication apparatus 300. In step S102, the sub data generation unit 108 of the authentication target apparatus 100 initializes the value of the sub data SD #1. Thereafter, the control unit 103 of the authentication target apparatus 100 notifies the control unit 303 of the authentication apparatus 300 of the completion of the initialization in step S103. At this time, the control unit 103 notifies the control unit 303 of the identifier ID stored in the storage unit 104 of the authentication target apparatus 100.

In step S104, the communication key generation unit 307 of the authentication apparatus 300 generates the communication key CK based on the second original key OK #2, the session value SV, and the identifier ID notified from the authentication target apparatus 100 as described in FIG. 6B. In step S105, the sub data generation unit 308 of the authentication apparatus 300 initializes the value of the sub data SD #2.

The order of the sequence illustrated in FIG. 7 is also only an example. For example, in the sequence of FIG. 7, the authentication apparatus 300 notifies the authentication target apparatus 100 of the session value SV together with the initialization command, and the authentication target apparatus 100 notifies the authentication apparatus 300 of the identifier ID when notifying the authentication apparatus 300 of the completion of the initialization. However, the notification of the session value SV to the authentication target apparatus 100 and the notification of the identifier ID to the authentication apparatus 300 can be performed at different timings. For example, in FIG. 7, the authentication apparatus 300 first notifies the authentication target apparatus 100 of the session value SV, but the authentication apparatus 300 may be configured to make a request to the authentication target apparatus 100 to acquire the identifier ID, and the session value SV may be notified after that. The authentication apparatus 300 can generate the communication key CK by acquiring the identifier ID from the authentication target apparatus 100. Similarly, the authentication apparatus 300 can generate the communication key CK by acquiring the session value SV from the authentication target apparatus 100. Also in the present embodiment, in the initialization processing, the authentication apparatus 300 and the authentication target apparatus 100 can exchange information required for generating the communication key CK, and the communication key CK can be generated at another timing prior to use of the communication key CK.

As described above, in the present embodiment, an authentication system is configured such that, in addition to updating the values of the sub data SD #1 and SD #2 in accordance with a predetermined update rule, a communication key CK that differs each time the initialization processing is performed can be generated. With this configuration, resistance to side channel attack becomes higher, and it is possible to make it difficult to infer secret information such as an authentication key and a verification key. Note that the processes for generating the concatenated data in FIG. 5A, FIG. 5B, FIG. 6A, and FIG. 6B can be replaced with a process according to a function that takes the two pieces of data used to generate the concatenated data as input and outputs one output value.

Third Embodiment

Figure 8A:
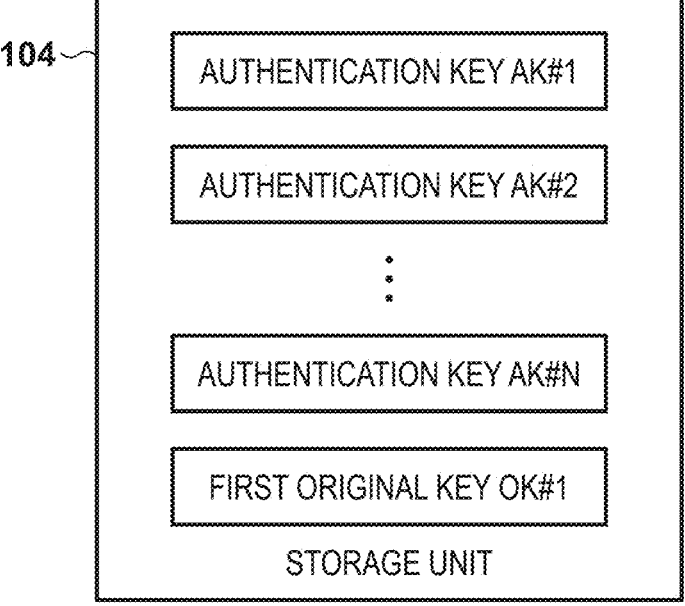
FIG. 8A is a diagram illustrating information stored in a storage unit of the authentication apparatus, according to some embodiments.
Figure 8B:
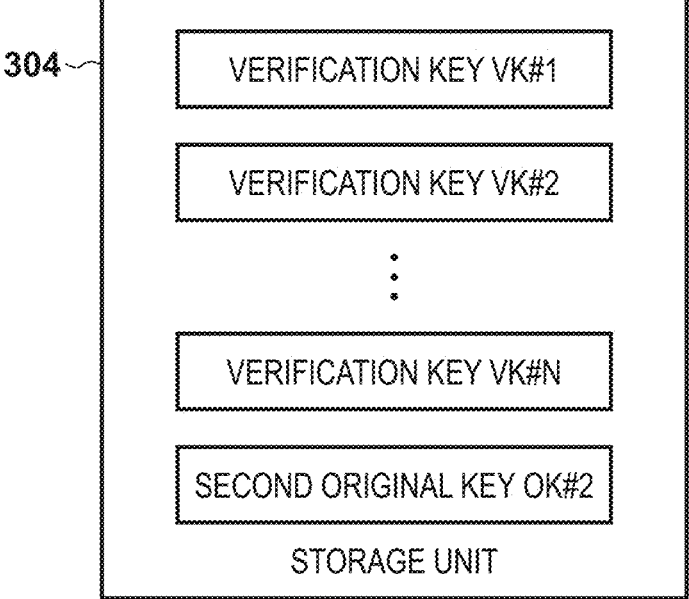
FIG. 8B is a diagram illustrating information stored in a storage unit of the authentication target apparatus, according to some embodiments.

Next, a third embodiment will be described with a focus on differences from the first embodiment and the second embodiment. In the first embodiment and the second embodiment, the authentication target apparatus 100 stores one authentication key AK, and the authentication apparatus 300 stores one verification key VK corresponding to one authentication key AK. In the present embodiment, as illustrated in FIG. 8A, N authentication keys AK #1 to AK #N (N is an integer of 2 or more) are stored in the storage unit 104 of the authentication target apparatus 100. Similarly, as illustrated in FIG. 8B, N verification keys VK #1 to VK #N are stored in the storage unit 304 of the authentication apparatus 300. Note that the authentication key AK #n (n is an integer from 1 to N) corresponds to the verification key VK #n. Here, #n is the key identification information KID of the authentication key and the verification key.

In this case, when the authentication process starts, the control unit 303 of the authentication apparatus 300 selects a verification key VK #n to be used for authentication from among the verification keys VK #1 to VK #N. Hereinafter, the selected verification key VK #n is also referred to as the selected verification key VK #n (selected verification information). The control unit 303 notifies the authentication unit 312 and the encryption unit 310 of the key identification information KID of the selected verification key VK #n. The encryption unit 310 encrypts data obtained by concatenating the challenge data CD and the key identification information KID to generate the encrypted data ED #1. Therefore, the decryption unit 109 of the authentication target apparatus 100 decrypts the encrypted data ED #1, thereby acquiring the challenge data CD and the key identification information KID, and outputting them to the authentication data generation unit 110.

FIG. 9A illustrates a configuration of the authentication data generation unit 110 according to the present embodiment. As described above, the challenge data CD and the key identification information KID are inputted to the authentication data generation unit 110 from the decryption unit 109. It is assumed that the key identification information KID indicates a value #n. In accordance with the key identification information KID, a selection unit 1101 determines the selected authentication key AK #n (selected authentication information) to be used for authentication from among the authentication keys AK #1 to AK #N stored in the storage unit 104, and outputs the selected authentication key AK #n to a generation unit 1102. The generation unit 1102 generates the authentication data AD based on the challenge data CD and the selected authentication key AK #n.

FIG. 9B illustrates a configuration of the authentication unit 312 according to the present embodiment. The key identification information KID is inputted to a selection unit 3121 from the control unit 303. The selection unit 3121 reads the selected verification key VK #n from the storage unit 304 in accordance with the key identification information KID, and outputs it to a generation unit 3122. The challenge data CD is inputted to the generation unit 3122 from the challenge data generation unit 309. The generation unit 3122 generates the verification data VD based on the challenge data CD and the selected verification key VK #n. A comparing unit 3123 compares the verification data VD from the generation unit 3122 with the authentication data AD from the decryption unit 311.

As described above, by making the authentication key AK and the verification key VK used for each authentication process different, it is possible to further increase the resistance to side channel attacks. Therefore, it is possible to make it difficult to infer secret information such as an authentication key and a verification key.

Fourth Embodiment

Next, a fourth embodiment will be described with a focus on differences from the first embodiment through to the third embodiment. In the first embodiment and the second embodiment, the authentication data generation unit 110 generates the authentication data AD based on the authentication key AK and the challenge data CD, and the authentication unit 312 generates the verification data VD based on the verification key VK and the challenge data CD. In the present embodiment, a random number (random data) RND is further used to generate the authentication data AD/verification data VD. The number of authentication keys/verification keys stored in the storage unit may be one as in the first embodiment, or may be N as in the third embodiment. Hereinafter, the number of authentication keys/verification keys stored in the storage unit is N as described in the third embodiment.

FIG. 10A illustrates a configuration of the authentication data generation unit 110 according to the present embodiment. Differences from the third embodiment illustrated in FIG. 9A will be described below. A random number generator 1103 generates the random number RND and outputs it to the generation unit 1102. The generation unit 1102 generates the authentication data AD based on the selected authentication key AK #n, the random number RND, and the challenge data CD. For example, the generation unit 1102 obtains a hash value of the concatenated data of the authentication key AK #n, the random number RND, and the challenge data CD, and sets this hash value as the authentication data AD.

The authentication data AD generated by the generation unit 1102 and the random number RND generated by the random number generator 1103 are outputted to the encryption unit 111. In this instance, the encryption unit 111 encrypts data obtained by concatenating the authentication data AD and the random number RND to generate the encrypted data ED #2. Therefore, the decryption unit 311 of the authentication apparatus 300 outputs the authentication data AD and the random number RND to the authentication unit 312.

FIG. 10B illustrates a configuration of the authentication unit 312 according to the present embodiment. Differences from the third embodiment illustrated in FIG. 9B will be described below. The generation unit 3122 generates the verification data VD based on the random number RND from the decryption unit 311, the selected verification key VK #n, and the challenge data CD. The method of generating the verification data VD is the same as the method of generating the authentication data AD. As described in the first embodiment, when the authentication target apparatus 100 has the correct authentication key VK, the information used to generate the authentication data AD and the information used to generate the verification data VD are the same. Therefore, the authentication target apparatus 100 can be authenticated by comparing the authentication data AD and the verification data VD.

As described above, by using the random number RND, the authentication data AD differs for each authentication even if the challenge data CD and the authentication key AK are the same. Accordingly, resistance to side channel attack can be increased, and it is possible to make it difficult to infer secret information such as an authentication key and a verification key.

Fifth Embodiment

Next, a fifth embodiment will be described with a focus on differences from the first to fourth embodiments. In the present embodiment, the authentication apparatus 300 generates a falsification detection key FK in addition to the communication key CK from the second original key OK #2. Similarly, the authentication target apparatus 100 generates the falsification detection key FK in addition to the communication key CK from the first original key OK #1. The falsification detection key FK is used to generate and inspect falsification detection data for detecting the falsification of the encrypted data ED #1 and the encrypted data ED #2. Hereinafter, the present embodiment will be described with an example of a case where the falsification detection key FK is applied to the configuration described in the fourth embodiment. However, the falsification detection key FK can also be applied to the configurations of the first to fourth embodiments.

The initialization processing according to the present embodiment is similar to that described in the first embodiment (FIG. 3) and the second embodiment (FIG. 7), except that the falsification detection key FK is also generated when the communication key CK is generated. Through the initialization processing, the authentication apparatus 300 and the authentication target apparatus 100 generate the same communication key CK, generate the same falsification detection key FK, and set the same initial values in the sub data SD #1 and SD #2. Also, setting of the initial values in the sub data SD #1 and SD #2 may be performed in the initialization processing, and the communication key CK and the falsification detection key FK may be performed at a different timing. When necessary, exchange of information needed to generate the communication key CK and the falsification detection key FK between the authentication apparatus 300 and the authentication target apparatus 100 is performed in the initialization processing.

Figures 11A, 11B:
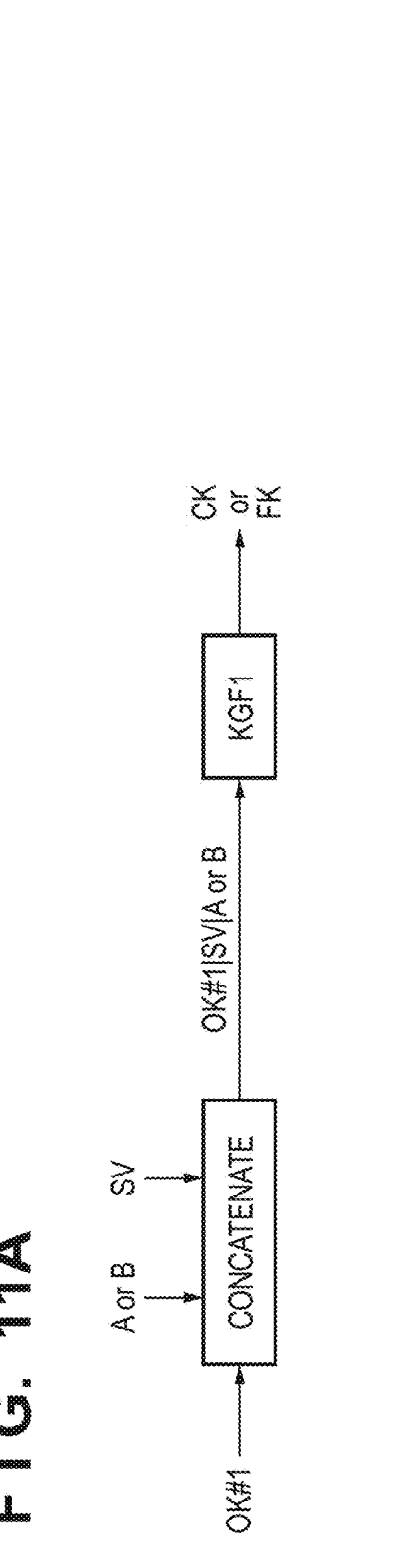
FIG. 11A and FIG. 11B are illustrations of a process for generating a communication key and a falsification detection key according to some embodiments.

FIG. 11A and FIG. 11B are explanatory diagrams of methods for generating the communication key CK and the falsification detection key FK according to the present embodiment. Note that FIG. 11A and FIG. 11B are based on the use of the session value SV and the identifier ID described using FIG. 6A and FIG. 6B, but it is possible to not use the identifier ID or to not use either of the session value SV and the identifier ID. A value A and a value B are stored in advance in the storage unit 304 of the authentication apparatus 300 and the storage unit 104 of the authentication target apparatus 100, respectively. The value A is used when generating the communication key CK, and the value B is used when generating the falsification detection key FK.

Specifically, as illustrated in FIG. 11A, the communication key generation unit 107 of the authentication target apparatus 100 generates the communication key CK by setting concatenated data of the first original key OK #1, the session value SV, and the value A as the input of the key generation function KGF1. The communication key generation unit 107 generates the falsification detection key FK by setting concatenated data of the first original key OK #1, the session value SV, and the value B as the input of the key generation function KGF1. Similarly, as illustrated in FIG. 11B, the communication key generation unit 307 of the authentication apparatus 300 generates the communication key CK by setting concatenated data of the first original key OK #1 generated based on the second original key OK #2, the session value SV, and the value A as the input of the key generation function KGF1. The communication key generation unit 307 generates the falsification detection key FK by setting concatenated data of the first original key OK #1 generated based on the second original key OK #2, the session value SV, and the value B as the input of the key generation function KGF1.

FIG. 12 and FIG. 13 are sequence diagrams of authentication processing according to the present embodiment. As described in the first embodiment, the values of the sub data SD #1 and SD #2 are the same at the beginning of the authenticating process of FIG. 12. In step S60, the control unit 303 determines the selected verification key VK #n and notifies the encryption unit 310 and the authentication unit 312 of the key identification information KID. In step S61, the challenge data generation unit 309 of the authentication apparatus 300 generates the challenge data CD and outputs it to the encryption unit 310. The method of generating the challenge data CD is discretionary. In step S62, the encryption unit 310 of the authentication apparatus 300 performs encryption of concatenated data of the challenge data CD and the key identification information KID based on the communication key CK and the sub data SD #2 from the sub data generation unit 308 to generate the encrypted data ED #1.

After generating the encrypted data ED #1, the sub data generation unit 308 of the authentication apparatus 300 updates the value of the sub data SD #2 in step S63. Subsequently, the encryption unit 310 of the authentication apparatus 300 generates falsification detection data FD #1 of the encrypted data ED #1 using the falsification detection key FK in step S64. The falsification detection data FD #1 is, for example, a message authentication code (MAC) of the encrypted data ED #1. Thereafter, in step S65, the control unit 303 of the authentication apparatus 300 transmits the encrypted data ED #1 and the falsification detection data FD #1 to the control unit 103 of the authentication target apparatus 100. The present embodiment is not limited to simultaneously transmitting the encrypted data ED #1 and the falsification detection data FD #1, and may be configured to transmit the encrypted data ED #1 and the falsification detection data FD #1 respectively at different predetermined timings. Further, an error detection code can be applied to the encrypted data ED #1 and the falsification detection data FD #1 as a whole.

After receiving the encrypted data ED #1 and the falsification detection data FD #1 from the control unit 103, the decryption unit 109 of the authentication target apparatus 100, in step S66, determines whether or not the encrypted data ED #1 has been falsified by inspecting the falsification detection data FD #1 by using the falsification detection key FK. If it is determined that the encrypted data ED #1 has been falsified, the control unit 103 notifies the control unit 303 of the falsification, and stops the subsequent process. In this case, the control unit 303 determines that the authentication is unsuccessful and stops the subsequent processing. In a case where the falsification detection data FD #1 is not received from the authentication apparatus 300, the subsequent process is stopped. If it is determined that the encrypted data ED #1 has not been falsified, the decryption unit 109, in step S67, decrypts the encrypted data ED #1 based on the communication key CK and the sub data SD #1, and acquires the challenge data CD and the key identification information KID. After decrypting the encrypted data ED #1, in step S68, the sub data generation unit 108 of the authentication target apparatus 100 updates the value of the sub data SD #1.

In step S69, the authentication data generation unit 110 generates a random number RND. Then, in step S70, the authentication data generation unit 110 generates the authentication data AD based on the selected authentication key AK #n specified by the key identification information KID, the random number RND, and the challenge data CD. In step S71, the encryption unit 111 of the authentication target apparatus 100 performs encryption of concatenated data of the authentication data AD and the random number RND based on the communication key CK and the sub data SD #1 from the sub data generation unit 308 to output encrypted data ED #2. After generating the encrypted data ED #2, the sub data generation unit 108 of the authentication target apparatus 100 updates the value of the sub data SD #1 in step S72. Subsequently, the encryption unit 111 generates falsification detection data FD #2 of the encrypted data ED #2 using the falsification detection key FK in step S73. The falsification detection data FD #2 is, for example, a message authentication code (MAC) of the encrypted data ED #2. In step S74, the control unit 103 of the authentication apparatus 300 transmits the encrypted data ED #2 and the falsification detection data FD #2 to the control unit 303. The present embodiment is not limited to simultaneously transmitting the encrypted data ED #2 and the falsification detection data FD #2, and may be configured to transmit the encrypted data ED #2 and the falsification detection data FD #2 respectively at different predetermined timings. Further, the encrypted data ED #2 and the falsification detection data FD #2 as a whole can be protected with an error detection code.

After receiving the encrypted data ED #2 and the falsification detection data FD #2 from the control unit 303, the decryption unit 311 of the authentication apparatus 300, in step S75, determines whether or not the encrypted data ED #2 has been falsified by inspecting the falsification detection data FD #2 by using the falsification detection key FK. When it is determined that the encrypted data ED #2 is falsified, the control unit 303 determines that the authentication is unsuccessful and stops the authentication process. It is similar in a case where the falsification detection data FD #2 is not received from the authentication target apparatus 100. If it is determined that the encrypted data ED #2 has not been falsified, the decryption unit 311, in step S76, decrypts the encrypted data ED #2 based on the communication key CK and the sub data SD #2, and acquires the authentication data AD and the random number RND. After decrypting the encrypted data ED #2, in step S77, the sub data generation unit 308 of the authentication apparatus 300 updates the value of the sub data SD #2.

In step S78, the authentication unit 312 of the authentication apparatus 300 generates the verification data VD based on the selected verification key VK #n specified by the key identification information KID notified from the control unit 303, the random number RND from the decryption unit 311, and the challenge data CD from the challenge data generation unit 309. In step S79, the authentication unit 312 authenticates the authentication target apparatus 100 by comparing the verification data VD with the authentication data AD from the decryption unit 311.

As described above, in the present embodiment, the falsification detection data is added to the encrypted data. Provided that the authentication apparatus 300 and the authentication target apparatus 100 do not have the same falsification detection key FK, the authentication data generation unit 110 does not generate the authentication data AD. Therefore, it is possible to increase the resistance to side channel attacks that require the authentication data generation unit 110 to repeatedly perform the calculation processing according to the authentication function. Therefore, it is possible to make it difficult to infer secret information such as an authentication key and a verification key.

In the present embodiment, the detection data for detecting the falsification of encrypted data (the encrypted data ED #1 and ED #2) is generated based on the falsification detection key FK, but the detection data for detecting the falsification of the pre-encrypted data may be generated based on the falsification detection key FK. In this case, it is detected, on the decryption side, whether or not the data obtained by decrypting the encrypted data is falsified based on the falsification detection key FK. Further, in the present embodiment, the falsification detection key FK is generated based on the same data as the communication key CK, but configuration may be taken to generate the falsification detection key FK based on data that differs from the communication key CK. Further, the falsification detection key FK itself may be stored in the storage unit.

In Addition

In each of the above embodiments, the authentication data AD and the verification data VD are hash values of a cryptographic hash function. However, the data obtained by encrypting the challenge data CD with the authentication key AK or the verification key VK can be used as the authentication data AD or the verification data VD. That is, the authentication data AD and the verification data VD may be generated by a cryptographic function instead of a cryptographic hash function. In the case of the fourth embodiment, the data obtained by encrypting concatenated data of the random number RND and the challenge data CD with the authentication key AK or the verification key VK can be used as the authentication data AD or the verification data VD. Further, in each of the above-described embodiments, the authentication key AK #n and the verification key VK #n in the correspondence relation are made to be the same data. However, if encryption based on an asymmetric key scheme is used, the authentication key AK #n and the verification key VK #n may be in a correspondence relation and be different data.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-199550, filed Dec. 14, 2022, which is hereby incorporated by reference herein in its entirety.

What is claimed is:

1. An authentication method for authenticating an authentication target apparatus storing one or more pieces of authentication information by an authentication apparatus storing one or more pieces of verification information, the one or more pieces of authentication information respectively corresponding to the one or more pieces of verification information, the authentication method comprising:

the authentication apparatus generating verification data by using selected verification information from among the one or more pieces of verification information and challenge data;

the authentication apparatus generating second data by performing first encryption processing on first data including the challenge data in accordance with first encryption processing information, and transmitting the second data to the authentication target apparatus;

the authentication target apparatus generating third data by performing second decryption processing on the second data in accordance with second encryption processing information;

the authentication target apparatus generating authentication data by using selected authentication information corresponding to the selected verification information from among the one or more pieces of authentication information and the challenge data included in the third data;

the authentication target apparatus generating fifth data by performing second encryption processing on fourth data including the authentication data in accordance with the second encryption processing information, and transmitting the fifth data to the authentication apparatus;

the authentication apparatus generating sixth data by performing first decryption processing on the fifth data in accordance with the first encryption processing information; and the authentication apparatus authenticating the authentication target apparatus by comparing the authentication data included in the sixth data and the verification data, wherein the first encryption processing information includes information indicating a communication key and information indicating seventh data, the second encryption processing information includes information indicating the communication key and information indicating the seventh data, the first encryption processing, the second encryption processing, the first decryption processing, and the second decryption processing are performed based on the communication key and the seventh data, the authentication apparatus changes the first encryption processing information by changing the seventh data when either of the first encryption processing and the first decryption processing is performed, and the authentication target apparatus changes the second encryption processing information by changing the seventh data when either of the second encryption processing and the second decryption processing is performed.

2. The authentication method according to claim 1, wherein the authentication apparatus performs the first decryption processing after the change to the first encryption processing information is performed due to the first encryption processing having been performed, and the authentication target apparatus performs the second encryption processing after the change to the second encryption processing information is performed due to the second decryption processing having been performed.

3. The authentication method according to claim 1, wherein the one or more pieces of verification information are a plurality of pieces of verification information, the one or more pieces of authentication information are a plurality of pieces of authentication information, and the authentication method further comprises:

the authentication apparatus selecting the selected verification information from the plurality of pieces of verification information;

the authentication apparatus including, in the first data, identification information for identifying the selected authentication information corresponding to the selected verification information; and the authentication target apparatus identifies the selected authentication information from among the plurality of pieces of authentication information based on the identification information included in the third data.

4. The authentication method according to claim 1, further comprising:

the authentication target apparatus including, in the fourth data, random data generated by the authentication target apparatus, wherein the authentication data is generated by using the random data generated by the authentication target apparatus in addition to the selected authentication information and the challenge data included in the third data, and the verification data is generated by using the random data included in the sixth data in addition to the selected verification information and the challenge data.

5. The authentication method according to claim 1, further comprising:

in response to a predetermined condition being satisfied, the authentication apparatus changing the seventh data to an initial value, and transmitting an initialization command to the authentication target apparatus, and in response to the initialization command being received from the authentication apparatus, the authentication target apparatus changing the seventh data to the initial value.

6. The authentication method according to claim 1, further comprising:

the authentication apparatus generating a session value, and generating the communication key based on the session value and a first original key, the authentication apparatus notifying the session value to the authentication target apparatus, and the authentication target apparatus generating the communication key based on the session value notified by the authentication apparatus and a second original key.

7. The authentication method according to claim 6, further comprising:

the authentication apparatus obtaining an identifier of the authentication target apparatus from the authentication target apparatus, wherein the authentication apparatus generates the communication key based on the session value, the first original key, and the identifier obtained from the authentication target apparatus, and the authentication target apparatus generates the communication key based on the session value, the second original key, and the identifier of the authentication target apparatus.

8. The authentication method according to claim 6, further comprising:

the authentication apparatus generating a detection key based on the first original key;

the authentication target apparatus generating the detection key based on the second original key;

the authentication apparatus generating, based on the detection key, first detection data for detecting a falsification of the second data, and transmitting the first detection data to the authentication target apparatus;

the authentication target apparatus detecting whether the second data is falsified by inspecting, based on the detection key, the first detection data received from the authentication apparatus;

the authentication target apparatus generating, based on the detection key, second detection data for detecting a falsification of the fifth data, and transmitting the second detection data to the authentication apparatus; and the authentication apparatus detecting whether the fifth data is falsified by inspecting, based on the detection key, the second detection data received from the authentication target apparatus, and wherein the authentication target apparatus, in a case where the second data is detected to have been falsified, does not perform the second decryption processing on the second data, and the authentication apparatus, in a case where the fifth data is detected to have been falsified, does not perform the first decryption processing on the fifth data.

9. An authentication target apparatus to be authenticated by an authentication apparatus, the authentication target apparatus comprising:

one or more processors; and one or more memory devices configured to store one or more pieces of authentication information and one or more programs, wherein the one or more programs, when executed by the one or more processors, cause the one or more processors to perform the functions of:

a first generation unit configured to generate encryption processing information;

a decryption unit configured to receive encrypted first data from the authentication apparatus, perform decryption processing on the first data in accordance with the encryption processing information generated by the first generation unit, and output second data;

a second generation unit configured to generate authentication data based on selected authentication information from among the one or more pieces of authentication information stored in the storage unit and challenge data included in the second data; and an encryption unit configured to perform encryption processing on third data including the authentication data in accordance with the encryption processing information generated by the first generation unit and thereby generate fourth data, and to transmit the fourth data to the authentication apparatus, wherein the encryption processing information includes information indicating a communication key and information indicating fifth data, the decryption processing and the encryption processing is performed based on the communication key and the fifth data, and the first generation unit is configured to change the encryption processing information by changing the fifth data when either of the decryption processing and the encryption processing is performed.

10. The authentication target apparatus according to claim 9, wherein the encryption unit is configured to perform the encryption processing after the first generation unit has performed the change to the encryption processing information due to the decryption processing having been performed.

11. The authentication target apparatus according to claim 9, wherein the one or more pieces of authentication information that the storage unit stores is a plurality of pieces of authentication information, and the second data includes information indicating the selected authentication information from among the plurality of pieces of authentication information.

12. The authentication target apparatus according to claim 9, further comprising:

a third generation unit configured to generate random data, wherein the second generation unit is configured to generate the authentication data based on the selected authentication information, the challenge data, and the random data generated by the third generation unit, and the third data includes the random data generated by the third generation unit.

13. The authentication target apparatus according to claim 9, wherein the first generation unit is configured to change the fifth data to an initial value in response to an initialization command being received from the authentication apparatus.

14. The authentication target apparatus according to claim 9, wherein the storage unit stores an original key, and the first generation unit is configured to generate the communication key based on the original key and a session value notified from the authentication apparatus.

15. The authentication target apparatus according to claim 14, wherein the first generation unit is configured to generate the communication key based on the original key, the session value, and an identifier of the authentication target apparatus.

16. The authentication target apparatus according to claim 14, wherein the first generation unit is configured to generate a detection key based on the original key, the decryption unit is configured to detect whether the first data is falsified by inspecting, based on the detection key, first detection data for detecting a falsification of the first data received from the authentication apparatus, the encryption unit is configured to generate, based on the detection key, second detection data for detecting a falsification of the fourth data, and transmitting the second detection data to the authentication apparatus; and the decryption unit, in a case where the first data is detected to have been falsified, does not perform the decryption processing on the first data.

17. A replacement unit of a predetermined apparatus including an authentication apparatus, wherein the replacement unit comprises an authentication target apparatus, wherein the authentication target apparatus comprises:

one or more processors; and one or more memory devices configured to store one or more pieces of authentication information and one or more programs, wherein the one or more programs, when executed by the one or more processors, cause the one or more processors to perform the functions of:

a first generation unit configured to generate encryption processing information;

a decryption unit configured to receive encrypted first data from the authentication apparatus, perform decryption processing on the first data in accordance with the encryption processing information generated by the first generation unit, and output second data;

a second generation unit configured to generate authentication data based on selected authentication information from among the one or more pieces of authentication information stored in the storage unit and challenge data included in the second data; and an encryption unit configured to perform encryption processing on third data including the authentication data in accordance with the encryption processing information generated by the first generation unit and thereby generate fourth data, and to transmit the fourth data to the authentication apparatus, wherein the encryption processing information includes information indicating a communication key and information indicating fifth data, the decryption processing and the encryption processing is performed based on the communication key and the fifth data, and the first generation unit is configured to change the encryption processing information by changing the fifth data when either of the decryption processing and the encryption processing is performed.

18. The replacement unit according to claim 17, wherein the predetermined apparatus is an image forming apparatus.

19. An authentication apparatus for authenticating an authentication target apparatus, the authentication apparatus comprising:

one or more processors; and one or more memory devices configured to store one or more pieces of verification information and one or more programs, wherein the one or more programs, when executed by the one or more processors, cause the one or more processors to perform the functions of:

a first generation unit configured to generate encryption processing information;

a second generation unit configured to generate challenge data;

an encryption unit configured to perform encryption processing on first data including the challenge data in accordance with the encryption processing information generated by the first generation unit and thereby generate second data, and to transmit the second data to the authentication target apparatus;

a decryption unit configured to receive encrypted third data from the authentication target apparatus as a response to having transmitted the second data to the authentication target apparatus, and generate fourth data by performing decryption processing on the third data in accordance with the encryption processing information generated by the first generation unit;

a third generation unit configured to generate verification data based on selected verification information from among the one or more pieces of verification information stored in the storage unit and the challenge data; and an authentication unit configured to authenticate the authentication target apparatus by comparing authentication data based on the challenge data included in the fourth data and the verification data, wherein the encryption processing information includes information indicating a communication key and information indicating fifth data, the decryption processing and the encryption processing is performed based on the communication key and the fifth data, and the first generation unit is configured to change the encryption processing information by changing the fifth data when either of the decryption processing and the encryption processing is performed.

20. The authentication apparatus according to claim 19, wherein the decryption unit is configured to perform the decryption processing after the first generation unit has performed the change to the encryption processing information due to the encryption processing having been performed.

21. The authentication apparatus according to claim 19, wherein the one or more pieces of verification information that the storage unit stores is a plurality of pieces of verification information, and the first data includes information indicating the selected verification information from among the plurality of pieces of verification information.

22. The authentication apparatus according to claim 19, wherein the fourth data includes random data, and the third generation unit is configured to generate the verification data based on the selected verification information, the challenge data, and the random data included in the fourth data.

23. The authentication apparatus according to claim 19, wherein the first generation unit is configured to, in response to a predetermined condition being satisfied, change the fifth data to an initial value, and transmit an initialization command to the authentication target apparatus.

24. The authentication apparatus according to claim 19, wherein the storage unit stores an original key, and the first generation unit is configured to generate a session value, and generate the communication key based on the original key and the session value.

25. The authentication apparatus according to claim 24, wherein the first generation unit is configured to generate the communication key based on the session value, the original key, and an identifier of the authentication target apparatus obtained from the authentication target apparatus.

26. The authentication apparatus according to claim 24, wherein the first generation unit is configured to generate a detection key based on the original key, the encryption unit is configured to generate, based on the detection key, first detection data for detecting a falsification of the second data, and transmitting the first detection data to the authentication target apparatus; and the decryption unit is configured to detect whether the third data is falsified by inspecting, based on the detection key, second detection data for detecting a falsification of the third data received from the authentication target apparatus, the decryption unit, in a case where the third data is detected to have been falsified, does not perform the decryption processing on the third data.

27. An image forming apparatus in which a replacement unit comprising an authentication target apparatus is mounted and for performing image formation, the image forming apparatus comprising an authentication apparatus, wherein the authentication apparatus comprises:

one or more processors; and one or more memory devices configured to store one or more pieces of verification information and one or more programs, wherein the one or more programs, when executed by the one or more processors, cause the one or more processors to perform the functions of:

a first generation unit configured to generate encryption processing information;

a second generation unit configured to generate challenge data;

an encryption unit configured to perform encryption processing on first data including the challenge data in accordance with the encryption processing information generated by the first generation unit and thereby generate second data, and to transmit the second data to the authentication target apparatus;

a decryption unit configured to receive encrypted third data from the authentication target apparatus as a response to having transmitted the second data to the authentication target apparatus, and generate fourth data by performing decryption processing on the third data in accordance with the encryption processing information generated by the first generation unit;

a third generation unit configured to generate verification data based on selected verification information from among the one or more pieces of verification information stored in the storage unit and the challenge data; and an authentication unit configured to authenticate the authentication target apparatus by comparing authentication data based on the challenge data included in the fourth data and the verification data, wherein the encryption processing information includes information indicating a communication key and information indicating fifth data, the decryption processing and the encryption processing is performed based on the communication key and the fifth data, and the first generation unit is configured to change the encryption processing information by changing the fifth data when either of the decryption processing and the encryption processing is performed.

* * * * *